United States Patent [19]
Foster et al.

[11] Patent Number: 5,814,292
[45] Date of Patent: Sep. 29, 1998

[54] COMPREHENSIVE ENERGY PRODUCING METHODS FOR AQUEOUS PHASE OXIDATION

[75] Inventors: George G. Foster; Frederick P. Kesler, both of Salt Lake City, Utah

[73] Assignee: Energy Research Group, Holladay, Utah

[21] Appl. No.: 770,646

[22] Filed: Dec. 19, 1996

[51] Int. Cl.[6] .............................. C01C 1/242; C02F 1/68; C02F 1/72

[52] U.S. Cl. .................. 423/549; 210/758; 210/761; 210/908; 423/29; 423/41; 423/313; 423/659; 588/205; 588/206

[58] Field of Search .................... 210/758, 761, 210/908; 423/36, 659, 41, 29, 549, 313; 588/205, 206, 208, 213

[56] References Cited

U.S. PATENT DOCUMENTS

| | | | |
|---|---|---|---|
| 3,637,371 | 1/1972 | Mackiw et al. | 75/101 |
| 3,649,665 | 3/1972 | Chafetz et al. | 260/466 |
| 3,793,429 | 2/1974 | Queneau et al. | 423/34 |
| 4,076,579 | 2/1978 | Brink | 162/53 |
| 4,141,829 | 2/1979 | Thiel et al. | 210/63 |
| 4,235,858 | 11/1980 | Blakey et al. | 423/393 |
| 4,272,383 | 6/1981 | McGrew | 210/741 |
| 4,606,763 | 8/1986 | Weir | 75/101 |
| 4,692,252 | 9/1987 | Atwood et al. | 210/761 |
| 4,744,908 | 5/1988 | Petscheck et al. | 210/747 |
| 4,793,919 | 12/1988 | McCorquodale | 210/177 |
| 4,803,054 | 2/1989 | Sillerud et al. | 422/109 |
| 4,849,025 | 7/1989 | Bain et al. | 134/22.1 |
| 4,891,139 | 1/1990 | Ziegler et al. | 210/747 |
| 4,897,156 | 1/1990 | Samuelson | 162/65 |
| 5,057,231 | 10/1991 | Mueller et al. | 210/761 |
| 5,106,513 | 4/1992 | Hong | 210/758 |
| 5,125,977 | 6/1992 | Grohmann et al. | 127/36 |
| 5,192,453 | 3/1993 | Keckler et al. | 210/761 |
| 5,232,604 | 8/1993 | Swallow et al. | 210/758 |
| 5,240,619 | 8/1993 | Copa et al. | 210/752 |
| 5,250,193 | 10/1993 | Sawicki et al. | 210/761 |
| 5,262,060 | 11/1993 | Lehmann et al. | 210/696 |
| 5,302,298 | 4/1994 | Leitzke | 210/748 |
| 5,316,567 | 5/1994 | Jones | 75/743 |
| 5,338,673 | 8/1994 | Thepenier et al. | 435/134 |
| 5,364,444 | 11/1994 | McDoulett, Jr. et al. | 75/421 |
| 5,368,750 | 11/1994 | Peterscheck et al. | 210/761 |
| 5,374,710 | 12/1994 | Tsien et al. | 534/552 |
| 5,387,751 | 2/1995 | Hayden et al. | 549/534 |
| 5,417,937 | 5/1995 | Voigt et al. | 422/189 |
| 5,425,800 | 6/1995 | Buter et al. | 75/744 |
| 5,427,747 | 6/1995 | Kong et al. | 422/186 |
| 5,431,788 | 7/1995 | Jones | 204/104 |
| 5,437,150 | 8/1995 | Latham et al. | 60/39.02 |
| 5,453,253 | 9/1995 | Von Röpenack et al. | 423/138 |
| 5,454,950 | 10/1995 | Li et al. | 210/636 |
| 5,478,549 | 12/1995 | Koch | 423/403 |
| 5,484,579 | 1/1996 | O'Brien | 423/36 |
| 5,491,968 | 2/1996 | Shouman | 60/39.05 |
| 5,492,624 | 2/1996 | Rozich | 210/605 |
| 5,498,766 | 3/1996 | Stuart et al. | 435/99 |
| 5,501,974 | 3/1996 | Griffin | 435/244 |
| 5,512,525 | 4/1996 | Tenten et al. | 502/26 |
| 5,512,599 | 4/1996 | Hiramatsu et al. | 518/703 |
| 5,516,345 | 5/1996 | Brown | 48/197 |
| 5,525,230 | 6/1996 | Wrigley et al. | 210/618 |

FOREIGN PATENT DOCUMENTS 1-310794  12/1989  Japan ........................ C02F 1/74

OTHER PUBLICATIONS

Prater, J.D. et al., *The Sulfation of Copper–Iron Sulfides with Concentrated Sulfuric Acid*, Journal of Metals, Dec. 1970, pp. 23–27.

*Primary Examiner*—Wayne Langel
*Attorney, Agent, or Firm*—Workman, Nydegger & Seeley

[57] ABSTRACT

An aqueous phase oxidization process for the oxidization of any nonoxidized feed material using a mixture of a feed material, an oxidizing acid, such as nitric acid; oxygen gas, water and preferably a stabilizing acid, such as sulfuric acid. The mixture is pressurized in a reactor and maintained at a temperature no greater than about 210° C. Sufficient oxygen gas is added to increase the pressure beyond the pressure resulting from any gases formed during the oxidation process and to ensure that a substantial portion of reduction products of nitric acid formed during oxidation of the feed are substantially reoxidized to nitric acid.

46 Claims, 2 Drawing Sheets

COMPREHENSIVE ENERGY PRODUCING METHODS FOR AQUEOUS PHASE OXIDATION

BACKGROUND OF THE INVENTION

1. The Field of the Invention

The present invention relates generally to the aqueous phase oxidation of any nonoxidized organic or inorganic feed material. More specifically, the present invention deals with a method for accomplishing wet oxidation of materials such as carbon-bearing biomass, rubber, sulphide containing ores, industrial waste streams and even municipal garbage.

2. Description of the Prior Art

Several processes having very specific applications have been developed for oxidation of various feed materials. Prior art oxidation methods and systems of inorganic materials are generally related to smelting or the removal of metal from ores. Most smelting processes are inherently problematic as the processes require large energy consumption, create gaseous emissions and obtaining complete recovery of all metals entering the process is very difficult.

Examples of oxidation processes and systems used for leaching metallic sulfide ores are disclosed in U.S. Pat. No. 3,793,429 issued to Queneau et. al. and U.S. Pat. No. 5,484,579 issued to O'Brien. These processes use a combination of oxygen and nitric acid at elevated temperatures to oxidize a feed material thereby releasing metals from sulfide ores. Both also recycle the expensive nitric acid and use sulfuric acid as well to produce the desired products. These processes, however, generate water so acid has to be added to raise the boiling point within the reaction range as stated in O'Brien at column 5, lines 12–18. Additionally, nitric acid must be added since 10%–20% of the nitrogen gases cannot be converted back to nitric acid as stated in O'Brien at column 6, lines 8–11. The nitrogen gases which are not regenerated in the reactor must be separately processed externally from the reactor as indicated at column 6, lines 39–48 in O'Brien.

Another significant problem with the process disclosed in O'Brien is the precipitation of sulfur which causes scaling. The sulfur tends to precipitate due to the extremely high concentration of sulfuric acid used in the process. It is stated in column 4, line 66 to column 5, line 6 that sufficient conversion of the sulfides and sulfates does not occur unless the concentration of sulfuric acid is at least in excess of 40% volume per volume of reaction mixture.

Additional problems related to these specific oxidation process and general metal recovery methods is that complete oxidization of all nonoxidized species entering the process cannot be ensured. These processes are also limited to very specific uses so a wide range of incoming feeds cannot be processes. Further, these processes do not produce useable energy from the oxidization reaction.

Prior art oxidation methods and systems of organic materials are generally related to the destruction of municipal organic waste. Examples of processes in the art used to destroy municipal organic waste through wet oxidization are disclosed in U.S. Pat. No. 4,272,383 issued to McGrew; U.S. Pat. No. 4,744,908 issued to Peterscheck et al.; U.S. Pat. No. 4,803,054 issued to Sillerud et al., and U.S. Pat. No. 4,891,139 issued to Zeigler et al. In general, these processes pump oxygen into down-hole reactors where waste is oxidized. To achieve desired levels of oxidation these processes generally require very high temperatures and pressures as well as lengthy reaction times. Despite the extremely high temperatures and pressures, these methods do not completely oxidize the incoming feed. The feed material is merely sufficiently reacted to detoxify the feed material thereby allowing for its release into the environment.

The elevated temperatures utilized for wet oxidation processes in down-hole reactors, which are typically between 260° C. and 360° C., produce scale buildup on the reactor walls. The scale buildup ultimately reduces the efficiency of the heat exchange process in the reactor. Consequently, the reactor must be cleaned, and the most common reagent utilized is nitric acid. Upon cleaning, however, waste nitric acid solution must be processed so as to allow for its disposal.

An extension of the wet oxidization processes is taught in U.S. Pat. No. 5,368,750 issued to Peterscheck et al. which uses a combination of oxidant such as oxygen, spent nitric acid and organic waste in the down-hole reactors to destroy the organic waste and reduce the nitrogen content of the nitric acid so as to allow for the solutions disposal. The purpose of the process is to destroy spent nitric acid, which initially was used to clean the reactor, by the creation of nitrogen gas. It cannot continuously process organic waste with a small quantity of nitric acid. This destruction is accomplished by starting the reaction at 150° C. and allowing the reaction temperature to increase to 260° C. Above 210° C., the nitric acid begins to crack and is effectively destroyed.

Despite the inherent energy contained in the feed material, none of the art teaches a process capable of recovering and using the energy released in the reactor. A process which could not only destroy unwanted municipal waste, but also produce useable energy from the process would be a significant improvement in the art.

Another method for oxidization of organic wastes is through combustion. This process, however, has several inherent problems. Combustion generally requires a uniform, or at least similar feed material being introduced into the reactor in order to provide efficient combustion. Additionally, the feed must be dried prior to combustion, and significant pollution controls must be present to prevent small particulates as well as gas byproducts from being discharged in the off gas. Additionally, all water generated by the oxidation of the organics will to be turned into steam thereby decreasing the useable energy from the reaction. This absorption of energy by the water substantially decreases the useable energy generated in the reaction. The temperatures required to burn any given material is over 2000° C., thereby requiring reactors capable of withstanding those temperatures and corrosive environments. A process which could produce the same ultimate results of a combustion reaction while able to react a wide variety of feed materials in the same reactor, perform the reaction at lower temperatures, not lose energy to steam generation, eliminate all particulate emission, and not require energy to dry the incoming feed would be a great advancement in the art.

It would be an additional advancement in the art to oxidize materials by a process that regenerates at least one reactant within the reactor.

It would also be an advancement in the art to provide oxidation methods and systems which do not result in scaling from sulfur deposits.

Additionally, it would be an advancement in the art to provide oxidation methods and systems which ensure full oxidation of feed material and that can be used with organic or inorganic feed materials.

It would be a further advancement in the art to provide oxidation methods and systems which can oxidize materials in reactors which do not need to be located far below ground level and which do not require flushing with nitric acid or the waste of nitric acid during flushing.

Finally, it would be an advancement in the art to provide oxidation methods and systems which can oxidize materials while utilizing the energy produced from the reaction.

SUMMARY AND OBJECTS OF THE INVENTION

Accordingly, an object of the present invention is to create a process capable of complete or sufficiently complete oxidization of any nonoxidized material at lower temperatures than combustion without losing energy to steam generation, particulate emission or drying of the feed stock.

An additional object of the invention is to oxidize materials by a process that regenerates at least one reactant within the reactor.

Another object of the invention is to provide oxidation methods and systems which do not result in scaling from sulfur deposits.

Additionally, an object of the invention is to provide oxidation methods and systems which ensure full oxidation of feed material and that can be used with organic or inorganic feed materials.

A further object is to provide oxidation methods and systems which can oxidize materials in reactors which do not need to be located far below ground level and which do not require flushing with nitric acid or the waste of nitric acid during flushing.

Finally, an object of the invention is to provide oxidation methods and systems which can oxidize materials while utilizing the energy produced from the reaction.

It is a feature of the invention to utilize a strong oxidizing acid in combination with oxygen, water and preferably a stabilizing acid to oxidize any organic or inorganic feed stock in a pressurized reactor at a temperature not greater than about 210° C. The oxidizing acid is preferably nitric acid and is more preferably nitric acid and at least one metallic polyacid. The method preferably operates on a continuous basis; however, when it is acceptable to oxidize feed stock in batches, the oxidizing acid can be a metallic polyacid, for example, molybdic acid, vanadic acid or chromic acid.

The stabilizing acid is preferably sulfuric acid and the concentration of the sulfuric acid is no greater than about 40% volume per volume of the reaction mixture. The oxygen in the pressurized reactor is preferably introduced as oxygen gas. The reaction temperature is always maintained at a temperature not greater than about 210° C. to avoid decomposing the nitric acid and is preferably in a range from about 100° C. to about 205° C. Pressure is formed in the reactor due to the formation of water vapor and carbon dioxide which is then further increased by the introduction of oxygen gas in a sufficient amount to substantially reoxidize any nitrites to nitric acid. The increase in pressure due to the oxygen beyond the pressure in the reactor from the formation of gases such as water vapor and carbon dioxide is preferably in a range from about 100 psig to about 250 psig.

The temperature and pressure facilitates rapid reaction of the feed material. The pressure increases the oxygen concentration inside the reactor and maintains the reaction products of the nitric acid in the reaction solution thereby allowing the reaction products sufficient time to contact and thereby react with the oxygen gas dispersed throughout the reactor. The final products from the reactor when oxidizing organic matter are generally carbon dioxide, water, ammonium sulfate and metal salts, typically sulfates. With the exception of the carbon dioxide, the final products from the reactor are similar when oxidizing inorganic matter.

An additional feature of the present invention is the generation of usable energy. Another feature of the present invention is the production of useable end products such as ammonium sulfate from waste organic feedstocks.

An advantage of the invention is that the same results of combustion are obtained by oxidizing any material at lower temperatures than combustion without losing energy to steam generation, particulate emission or drying of the feed stock. Another advantage is the elimination of the need for smelting of metal containing ores.

These advantages together with other objects, features and advantages which will become subsequently apparent reside in the details of construction and operation as more fully hereinafter described and claimed, reference being had to the accompanying drawings forming a part hereof. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only a typical and general process embodiment of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
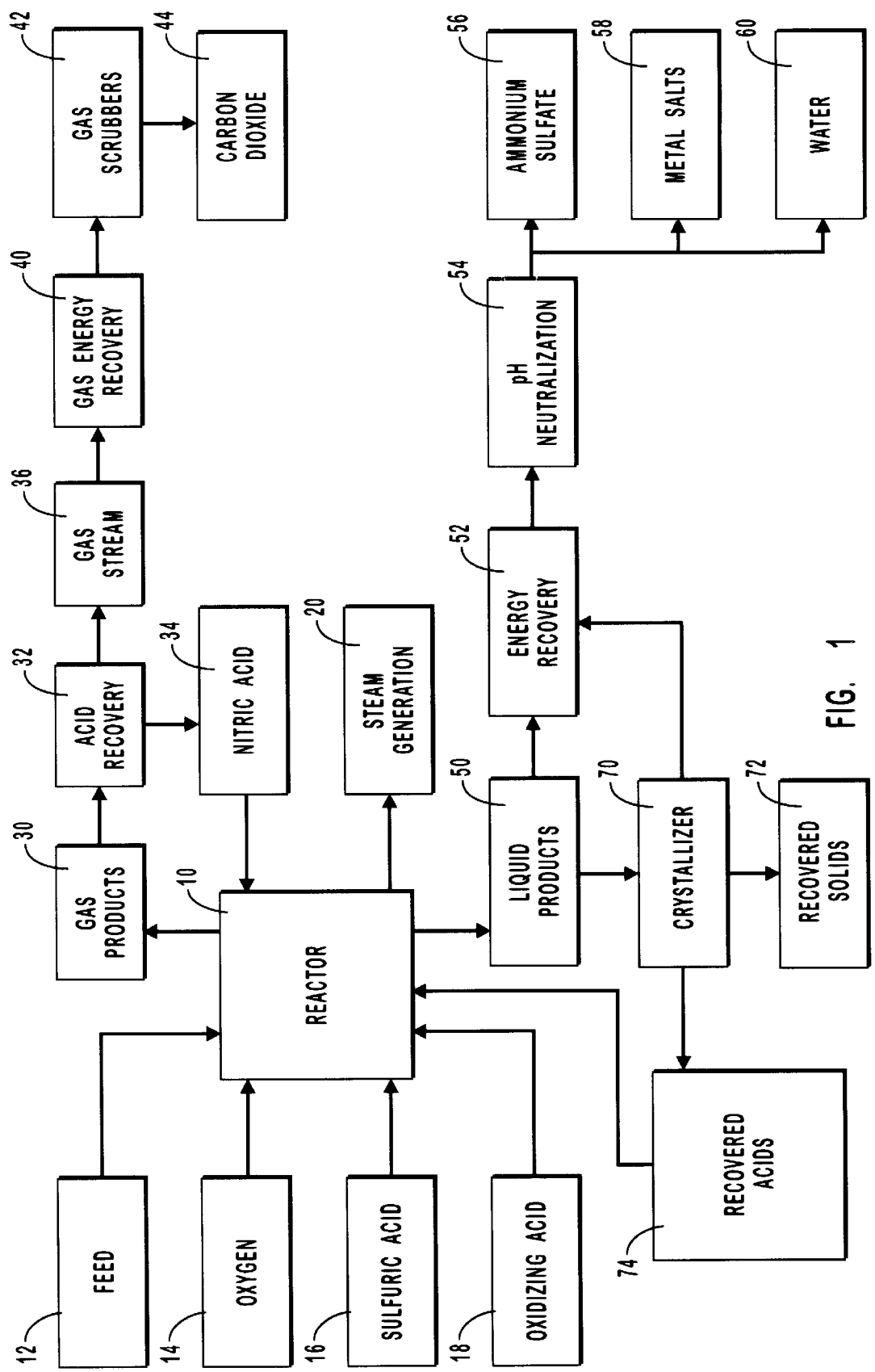
FIG. 1 is a schematic of a flow diagram using a mixture of nitric acid, sulfuric acid and oxygen within the reactor to oxidize a feedstock.

The process and system of this invention are capable of essentially oxidizing any feed material. It has been found that regardless of whether the feed material is organic matter or inorganic matter, the principles of the oxidization reaction are virtually the same. Examples of oxidizable feedstock includes municipal and farm waste such as sewage solids including dewatered sewage or municipal sludge cake, and animal manure; slaughter house waste including blood, lungs, trachea, kidneys, fat and small bone chips; petroleum waste byproducts such as plastics, rubbers and paints; used tires; wood pulp; nerve gas; municipal garbage which is today buried in landfills; and metal ore such as sulfide containing ores which are typically sent into smelters.

To oxidize a feed stock, the feed stock is introduced into a reactor and contacted with an oxidizing composition to yield a reaction mixture which oxidizes the feed. The oxidizing composition includes an oxidizing acid, water, oxygen and preferably a stabilizing acid. This oxidizing acid oxidizes the feed and when nitric acid is included in the oxidizing acid then the nitric acid is regenerated in situ by reacting with the oxygen gas introduced into the reaction. Not only will the process destroy unwanted materials, but it is capable of producing significant excess energy as well as desirable products such as ammonium sulfate from an extremely wide range of feed materials.

One accepted formulation used to approximate biological waste is:

$$C_{120}H_{174}O_{46}N_{24}P_2$$

As noted this is an average formula derived from various organic compounds that make up the common biological components of cellulose and protein. Naturally, some plastics will deviate from the above formula with the addition of other substituted elements within the polymer. With the introduction of such an organic feed into a reactor containing an oxidizing composition comprising an oxidizing acid, such as nitric acid, a stabilizing acid such as sulfuric acid, and oxygen, the final products of the reaction are carbon dioxide which contains the feed carbon; ammonium sulfate or $(NH_4)_2SO_4$ which contains the feed nitrogen and some of the hydrogen; water which constitutes the remaining hydrogen and oxygen; iron phosphate salts; and phosphoric acid. It will be obvious to one skilled in the art that with an input of large organic compounds and products of $CO_2$, $H_2O$, and $(NH_4)_2SO_4$, that a significant quantity of energy is released. The present invention can not only destroy toxic and unwanted materials, but because of the reaction, it will release significant quantities of energy as well. It is also possible to use the present invention without taking the feed material all the way to $CO_2$, $H_2O$, and $(NH_4)_2SO_4$. If only partially oxidized products are sufficient for the reaction, then the time the feed material spends in the reactor can be limited to produce any level of oxidization desired.

Any inert material present in the feed, such as glass, rock, or dirt simply pass unaffected through the reactor. Metals such as aluminum, tin, copper and iron are oxidized into their respective sulfates and can be extracted from the reaction products exiting the reactor thereby eliminating the need for smelting.

The reaction proceeds after the feed is contacted in a reactor with the oxidizing composition to yield a reaction mixture; heating of the reaction mixture at a temperature not greater than about 210° C.; and increasing the pressure within the reactor through the introduction of oxygen. The feedstock is then oxidized by the oxidizing acid. Nitric acid, which is the preferred oxidizing acid, is reduced to acid reduction products such as various nitrites and then the acid reduction products are re-oxidized by the oxygen in an anodic reaction to regenerate nitric acid. The reaction temperature is always maintained at a temperature not greater than about 210° C. to avoid decomposing the nitric acid and is preferably in a range from about 100° C. to about 205° C. It is generally not necessary to heat the feedstock as it is easier to heat the oxidizing composition or reaction mixture.

The source of oxygen is immaterial to the process. It can be from air, pure oxygen, or even a by-product of another reaction. Furthermore the process does not require that the oxygen be dissolved in the system, rather, oxygen bubbles act as a type of anode on which a surface reaction takes place which results in the acid reduction product being re-oxidized and regenerated in situ. The increased pressure is used to create a sufficient concentration of oxygen bubbles for the reaction in order to facilitate the acid reoxidization. Additionally, when nitric acid is used, this pressure forces the reduced nitric acid to remain in the liquid solution thereby allowing the oxygen gas to reoxidize the $NO_x$ back to nitric acid. The oxidizing acid is thereby repeatedly regenerated and can continue to attack the feed for as long as the acid remains in solution and has access to a sufficient anodic surface area of gaseous oxygen bubbles to be regenerated. The regeneration of reduced oxidizing acid within the reactor by the oxygen enhances the efficiency of this process as it enables a non-stoichiometric amount of oxidizing acid to completely oxidize the organic feedstock.

The gases formed during the oxidation process, such as water vapor and carbon dioxide, provide pressure within the reactor so the oxygen further increases the pressure. Accordingly, the oxygen gas is preferably introduced into the pressurizable reactor in sufficient quantity that at a specific operating temperature the pressure increases in the pressurizable reactor beyond pressure resulting from any gases formed during the oxidation process and to ensure that a substantial portion of reduction products of nitric acid formed during oxidation of the feed are substantially reoxidized to nitric acid. The oxygen is preferably included in the pressurizable reactor in an amount of at least 30 psig beyond the pressure resulting from any gases formed during the oxidation process or as commonly referred to in the art, the oxygen is included in an amount of 30 psig "oxygen over pressure." Oxygen is more preferably included in sufficient quantity such that at the operating temperature of the reaction mixture an increase in pressure in the reactor occurs beyond pressure resulting from gases formed during the oxidation process in an amount greater than about 90 psig and most preferably in a range from about 100 psig to about 250 psig. Pressures as high as up to about 1000 psig or even higher can also be used although such high pressures are generally not necessary. Due primarily to the pressure in the reactor, the oxidation does not significantly rely on solubility of oxygen to remain in the acid solution and oxidize the feed.

The pressure as indicated by a gauge reading of the reactor pressure includes the total pressure from the oxygen and oxidation by-product gases. Pressure based on "oxygen over pressure" is more reliable than gauge readings, however, when the gauge reads about 7 or about 8 atm or about 1000 psig the reaction generally occurs at satisfactory reaction rates.

When a substantial portion of reduction products of nitric acid formed during oxidation of the feed are substantially reoxidized to nitric acid, at least 50% of the reduction products are reoxidized to nitric acid, preferably at least 75% and most preferably at least 90% are reoxidized to nitric acid without any processing of the composition external to the reactor. Substantial reoxidation refers to reoxidation of nitrites or lower oxides of nitrogen to oxidizing agents selected from the group consisting of nitric acid or derivatives thereof capable of oxidizing the feed.

Nitric acid is preferably included in the reaction mixture in an amount of at least about 1% by volume per volume of the reaction mixture. The nitric acid is more preferably included in an amount of about 3% to about 20%, even more preferably about 5% to about 15% and most preferably about 8% by volume per volume of the reaction mixture.

Due to the ability to regenerate the nitric acid, the oxidation process can operate continually. In some instances, it is preferable to include metallic polyacids such as in metal recovery or in the oxidation of wood pulp, to increase the oxidation rate. Examples of useful metallic polyacids include but are not limited to molybdic acid, vanadic acid, rhennic acid and chromic acid. Metallic polyacids are generally useful due to their high oxygen content. Because these acids are particularly oxygen rich, they facilitate the cathodic regeneration of the nitric inside the reactor and also catalyze the reaction allowing the reaction to initiate at a lower temperature and proceed at an accelerated rate, when compared to those reactions running with nitric acid. Metallic polyacids can also be used without nitric acid. Metallic polyacids used without nitric acid can, however, only be used on a batch basis as the polyacids are not regenerated. Accordingly, nitric acid is the preferred oxidation acid.

The oxidation process can be utilized successfully without stabilizing acids such as sulfuric acid, phosphoric acid or metallic polyacids; however, such stabilizing acids are preferably present. Sulfuric acid is the preferred stabilizing acid mainly due to low cost. Sulfuric acid is preferably included in the reaction mixture in an amount not greater than about 40% by volume of sulfuric acid per volume of the reaction mixture; more preferably in an amount in a range from about 5% to about 20% by volume of sulfuric acid per volume of the reaction mixture; and most preferably in an amount in a range from about 5% to about 20% by volume of sulfuric acid per volume of the reaction mixture.

The sulfate ions of the sulfuric acid convert the salt forming reaction products into stable sulfate salts, thereby leaving the nitric acid in the acid state to continue as an oxidant, and ultimately allows the nitric acid to be driven off as a reduced gas, regenerated and returned to the reactor. This also prevents the formation of such compounds as ammonium nitrate, an explosive, and instead produces ammonium sulfate, a fertilizer. While sulfuric acid is the most commonly used stabilizing acid, and the one used in the description, any other acid such as phosphoric acid capable of generating a stable ammonium salt can be used. Typically, any oxygen stabilizing acid would itself be fully oxidized so as to not require its own oxidization in the reaction.

When metal sulfide ores are reacted in the reaction they become metal sulfates and sulfuric acid. These sulfates can then be leached and extracted by standard commercially developed processes such as precipitation, electro winning, solvent extraction and ion exchange just to name a few. With acid control the iron can be precipitated in the form of iron-iron oxide, and thereby leaving the other more desired materials in solution.

The process can also be used to produce various levels of oxidation of an input nonoxidated feed. While generally full oxidation is desired, it is not required. For example, in biological wastes, it has been observed that mercaptans react more rapidly than complete biological mass. It is therefore possible to only partially oxidize the feed by allowing the reaction to proceed only long enough to destroy the unwanted and easily reacted mercaptans. It is also possible to take a nonoxidized feed incapable of being broken down in sail, and react it sufficiently that the partially oxidized product and the ammonium sulfate product can be mixed together to produce a material which will naturally and slowly breakdown to enhance the soil.

One embodiment of the present invention is shown in FIG. 1. This diagram depicts a process capable of continuous operation as well as batch operation. The process uses a pressurized reactor vessel 10. Vessel 10 is formed from a resilient and relatively inert material such as titanium. Vessel 10 also preferably has mixing means for mixing nonoxidized feedstock 12 with an oxidizing composition. An example of mixing means are rotating blades which increase the contact between nonoxidized feedstock 12 and the oxidizing composition to yield a reaction mixture. The oxidizing composition is formed by introducing oxygen 14, sulfuric acid 16, and an oxidizing acid 18 such as nitric acid into reactor 10.

During the reaction the heat generated from the exothermic oxidization reaction must be dissipated and can be used for a variety of purposes, one of which is steam generation 20. The generation of carbon dioxide can also be utilized to provide energy to pressurize a turbine (not shown) that pumps oxygen 14 into reactor 10. Upon reaction completion, gas products 30, including $CO_2$ and $NO_X$, exit reactor vessel 10. The $NO_X$ is then separated and reoxidized to nitric acid in an acid recovery system 32 and nitric acid 34 is returned to reactor vessel 10. The ability of nitric acid to be easily recovered after it leaves the reactor and reintroduced back into the reactor makes nitric acid particularly suited for commercial applications of this process. After nitric acid 34 has been recovered, the remaining gas stream 36 can be processed through a gas energy recovery process 40 and a gas scrubber system 42 before the $CO_2$ 44 is released. Liquid products 50 also exit reactor vessel 10 and can be processed through a gas energy recovery system 52 prior to a pH neutralizing 54 of the sulfuric acid remaining after reaction completion. Gas energy recovery system 52 comprises running gas through a turbine for electrical generation and heat recovery for use a preheater for the feed or to boil refrigerant in a heat pump. Due to the use of energy recovery system 52 and pH neutralizer 54, the water content in liquid products 50 can be very high. This process finally produces ammonium sulfate 56, metal salts 58, and water 60. Additionally, liquid products 50 can be sent to a crystallizer 70 for removal of solids from residual acids. After the recovered solids 72 are separated from the recovered acids 74 then the recovered acids can be returned to reactor 10.

Figure 2:
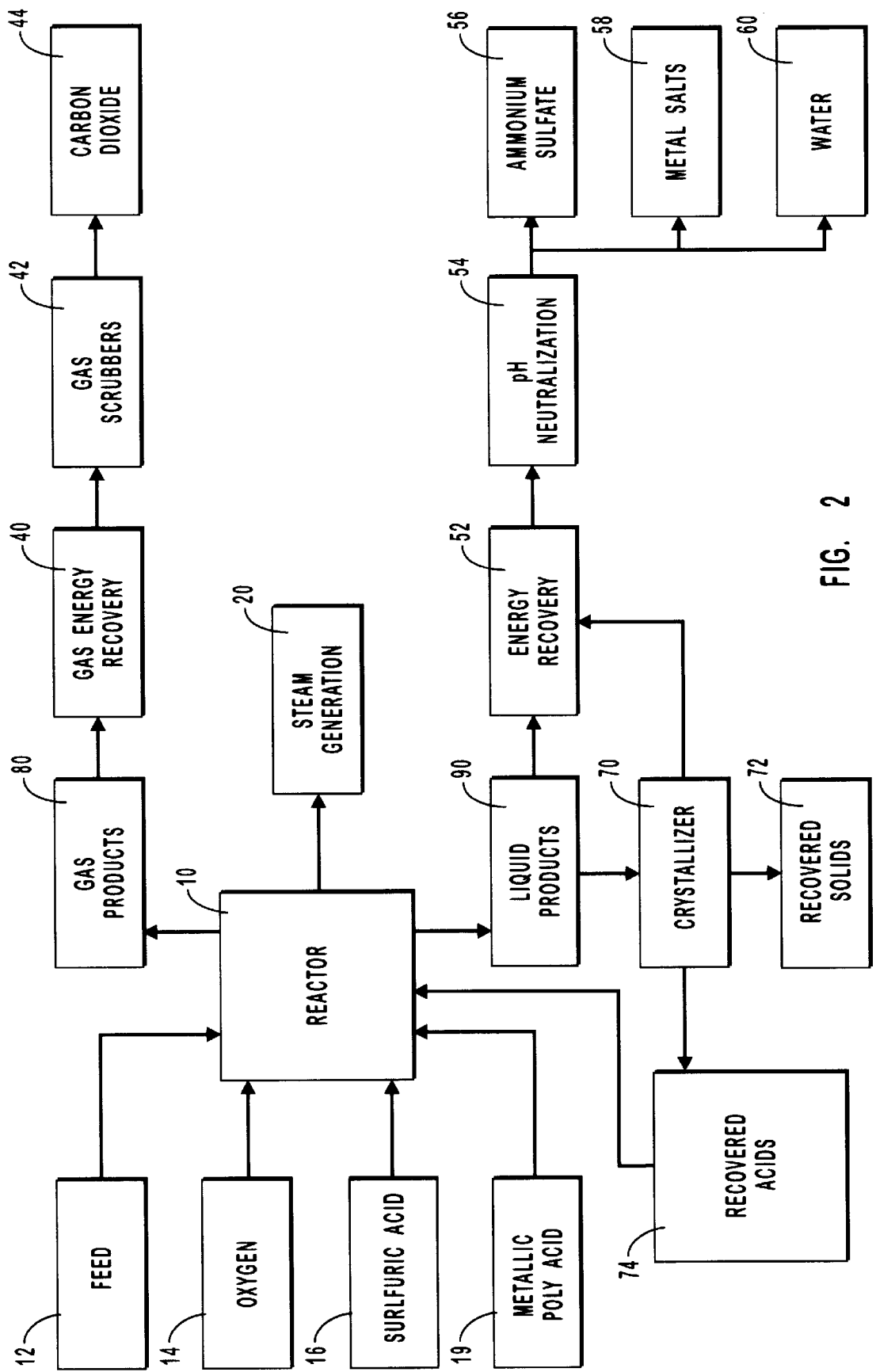
FIG. 2 is a schematic of a flow diagram using a mixture of metallic polyacids, sulfuric acid and oxygen within the reactor to oxidize a feedstock.

Another embodiment of the invention, shown in FIG. 2, uses metallic poly acids such as molybdic, vanadic and chromic acids as reaction catalysts. The process using the metallic poly acids is very similar to the process shown in FIG. 1, except recovery of the metallic poly acids is not as simple as separating $NO_x$ gas, reoxidizing the $NO_X$ and reintroducing it into the reactor. In this embodiment a metallic poly acid 19, sulfuric acid 16, oxygen 14, and nonoxidized feedstock 12, are introduced into a pressurized reactor vessel 10. Energy from the reactor is removed and can be used for steam generation 20. Gas products 80 are processed through a gas energy recovery system 40 as well as gas scrubbers 42 prior to carbon dioxide discharge 44. Liquid products 90 exit the reactor 10 and go through energy recovery 52 as well as pH neutralizing 54 for the remaining sulfuric acid in order to produce ammonium sulfate 56, metal salts 58, which includes the metals from the metallic poly acid 19, and water 60. Additionally, liquid products 50 can be sent to a crystallizer 70 for separation of solids 72 from acids 74 which are then returned to reactor 10.

In addition, to providing comprehensive aqueous phase oxidation methods, the present invention further provides methods and systems for producing energy. The reaction is highly exothermic and the present invention provides several methods for harnessing the energy generated from the reaction. Some of the disclosed methods for generating electricity include the generation of steam to drive a turbine, the generation of high pressure carbon dioxide to drive a turbine and gas energy recovery processes which also drive turbines. This is a substantial improvement over other methods of oxidation such as combustion which fail to harness the energy released by the exothermic reaction. In addition to the ability to utilize the energy produced from the reaction, the methods are further environmentally advantageous as they provide for the conversion of materials which are an enormous disposal problem such as garbage and sewage solids into carbon dioxide. Emission of carbon dioxide results in significantly less environmental impact than the disposal of waste products and garbage.

Preferred embodiments of the invention are further exemplified in accordance with the following examples of oxidation of various nonoxidized feedstocks. These examples are not at all intended to limit the scope of the present invention, but instead serve as a few of a nearly infinite group of feed materials.

EXAMPLE 1

A mixture of 60 cc of 54% nitric acid, 50 cc of 98% sulfuric acid, 60 grams of municipal sludge cake, i.e. the end product of aerobic digestion in sewage treatment plants currently being buried in land fills, and 440 cc of water was introduced into a reaction vessel. The material was reacted using an initial pressure of 200 psig as measured at the gauge; however, the actual pressure was much higher as the water vapor and carbon dioxide further increased the pressure. The reaction was run for 36 minutes at 210° C. with the pressure building to 680 psig. The carbon in the municipal sludge cake was released as carbon dioxide and the ammonia remained present.

EXAMPLE 2

A mixture of 60 cc of 54% nitric acid, 40 cc of 98% sulfuric acid, 7.2 grams of solid cow waste and 430 cc of water was introduced into a reaction vessel. The material was reacted using an initial pressure of 200 psig. The reaction was run for 36 minutes at 205° C. The reaction was complete as the carbon in the cow waste was released as carbon dioxide and the ammonia remained present.

EXAMPLE 3

A mixture of 60 cc of 54% nitric acid, 50 cc of 98% sulfuric acid, 7 grams of rubber from ground automobile tires, and 440 cc of water was introduced into a reaction vessel. The material was reacted using an initial pressure of 200 psig. The reaction was run for 40 minutes to a temperature of 205° C. with the pressure building to 830 psig. The reaction was complete as the carbon in the rubber was released as carbon dioxide.

EXAMPLE 4

A mixture of 60 cc of 54% nitric acid, 50 cc of 98% sulfuric acid, 50 grams of metal sulfide ore, and 440 cc of water was introduced into a reaction vessel. The material was reacted using an initial pressure of 200 psig. The reaction was run for 40 minutes to a temperature of 205° C. with the pressure building to 830 psig. The reaction was complete.

EXAMPLE 5

A mixture of 60 cc of 54% nitric acid, 40 cc of 98% sulfuric acid, 7.5 grams of dry wood fiber (saw dust) and 370 cc of water were introduced into a reaction vessel. The test material was a combination of "sweepings" from a wood shop floor and included saw dust from plywood, particle board, paneling and hardwoods of several types. The material was reacted using an initial oxygen overpressure of 150 psig. The reaction was run for 34 minutes at 202° C. and reached a pressure of 780 psig. The reaction was complete. The filtrate from the reacted liquid was highly carbonated. The high pressure buildup resulted primarily from carbon dioxide formation. The material was so thoroughly destroyed that when the underflow from the reactor was filtered, there were no solids at all in the filter paper except sand which was added to the saw dust during sweeping of the floor.

EXAMPLE 6

A mixture of 60 cc of 54% nitric acid, 40 cc of 98% sulfuric acid, 75 grams of sulfide ore concentrate and 370 cc of water were introduced into a reaction vessel. The sulfide ore concentrate was obtained from Bear Creek's operations at Barney's Canyon, Utah. The sulfide ore concentrate was reacted using an initial oxygen overpressure of 150 psig. The reaction was run for 32 minutes and reached a temperature of 204° C. and a pressure of 440 psig. The reaction was complete. The filtrate from the reacted liquid was brown from oxides and sulfates of iron and copper. The remaining solids from the reaction contained no oxides of sulfur and no organics. The material was so thoroughly oxidized in all aspects, that the noble metals could be recovered by cyanide leaching with no recourse to aqua regia.

Although preferred embodiments of the invention are described herein in detail, it will be understood by those skilled in the art that variations may be made thereto without departing from the spirit of the invention or the scope of the claims.

What is claimed and desired to be secured by United States Letters Patent is:

1. An aqueous phase oxidization process comprising:
   (a) contacting a nonoxidized feed in a reactor with an oxidizing composition to yield a reaction mixture in which the feed is oxidized to produce final products, wherein the final products include gases which form pressure within the reactor such that the reaction mixture is maintained under pressure,
      (i) wherein said oxidizing composition includes an oxidizing acid, a stabilizing acid, water and oxygen gas,
      (ii) wherein said oxidizing acid includes nitric acid in an amount of at least about 3% by volume of nitric acid per volume of said reaction mixture,
      (ii) wherein said stabilizing acid is included in said reaction mixture in an amount of at least about 5% and less than 40% by volume of said stabilizing acid per volume of said reaction mixture, and
      (iv) wherein said oxygen gas is included in a sufficient quantity in said reaction mixture that, at a temperature of the reaction mixture, an increase in pressure is provided in said reactor beyond pressure resulting from any gases formed during the oxidation process and to ensure that a substantial portion of reduction products of nitric acid formed during oxidation of the feed are reoxidized to nitric acid primarily in the reactor;
   (b) maintaining said reaction mixture at a temperature not greater than about 210° C.; and
   (c) continually introducing and dispersing the oxygen gas in the reaction mixture.

2. An aqueous phase oxidization process as recited in claim 1, wherein said nonoxidized feed is organic material.

3. An aqueous phase oxidization process as recited in claim 1, wherein said nonoxidized feed is inorganic material.

4. An aqueous phase oxidization process as recited in claim 1, wherein said nitric acid is included in an amount ranging from about 3% to about 20% by volume of nitric acid per volume of the reaction mixture.

5. An aqueous phase oxidization process as recited in claim 1, wherein said oxidizing acid further comprises a metallic polyacid.

6. An aqueous phase oxidization process as recited in claim 1, wherein said oxidizing acid further comprises a metallic polyacid selected from the group consisting of molybdic acid, vanadic acid, rhennic acid and chromic acid.

7. An aqueous phase oxidization process as recited in claim 1, wherein said stabilizing acid is included in said reaction mixture in an amount in a range from about 5% to about 20% by volume of stabilizing acid per volume of said reaction mixture.

8. An aqueous phase oxidization process as recited in claim 1, wherein said stabilizing acid is capable of generating a stable ammonium salt through the oxidation process.

9. An aqueous phase oxidization process as recited in claim 1, wherein said stabilizing acid is selected from the group consisting of sulfuric acid, phosphoric acid and metallic polyacids.

10. An aqueous phase oxidization process as recited in claim 1, wherein said oxygen gas is included in said reaction mixture in a sufficient quantity that, at a temperature of the reaction mixture, an increase in pressure is provided beyond pressure resulting from any gases formed during the oxidation process in an amount of at least 30 psig.

11. An aqueous phase oxidization process as recited in claim 1, wherein said oxygen gas is included in said reaction mixture in a sufficient quantity that, at a temperature of the reaction mixture, an increase in pressure is provided beyond pressure resulting from any gases formed during the oxidation process in an amount greater than about 90 psig.

12. An aqueous phase oxidization process as recited in claim 1, wherein said oxygen gas is included in said reaction mixture in a sufficient quantity that, at a temperature of the reaction mixture, an increase in pressure is provided beyond pressure resulting from any gases formed during the oxidation process in an amount in a range from about 100 psig to about 250 psig.

13. An aqueous phase oxidization process as recited in claim 1, wherein said reaction mixture temperature is in a range from about 100° C. to about 210° C.

14. An aqueous phase oxidization process as recited in claim 1, wherein at least 50% of said reduction products of nitric acid are reoxidized to nitric acid.

15. An aqueous phase oxidization process as recited in claim 1, wherein said final products include ammonium sulfate, the process further comprising recovering ammonium sulfate from said final products.

16. An aqueous phase oxidization process as recited in claim 1, further comprising recovering excess energy produced during oxidation of the feed.

17. An aqueous phase oxidization process as recited in claim 1, wherein the process operates on a continuous basis to the extent that the nitric acid is regenerated.

18. An aqueous phase oxidization process comprising:
  (a) contacting a nonoxidized feed in a reactor with an oxidizing composition to yield a reaction mixture in which the feed is oxidized to produce final products in an amount of time no greater than 40 minutes, wherein the final products include gases which form pressure within the reactor such that the reaction mixture is maintained under pressure,
    (i) wherein said oxidizing composition includes an oxidizing acid, a stabilizing acid, water and oxygen gas,
    (ii) wherein said oxidizing acid includes nitric acid in an amount of at least about 3% by volume nitric acid per volume of said reaction mixture,
    (iii) wherein said stabilizing acid is included in said reaction mixture in an amount of at least about 5% and less than 40% by volume of said stabilizing acid per volume of said reaction mixture, and
    (iv) wherein said oxygen gas is included in a sufficient quantity in said reaction mixture that, at a temperature of the reaction mixture, an increase in pressure is provided in said pressurizable reactor beyond pressure resulting from any gases formed during the oxidation process and to ensure that a substantial portion of reduction products of nitric acid formed during oxidation of the feed are reoxidized to nitric acid primarily in the reactor;
  (b) maintaining said reaction mixture at a temperature not greater than about 210° C.; and
  (c) continually introducing and dispersing the oxygen gas in the reaction mixture.

19. An aqueous phase oxidization process as recited in claim 18, wherein said nitric acid is included in an amount ranging from about 3% to about 20% by volume of nitric acid per volume of the reaction mixture.

20. An aqueous phase oxidization process as recited in claim 18, wherein said oxidizing acid further comprises a metallic polyacid.

21. An aqueous phase oxidization process as recited in claim 18, wherein said stabilizing acid is included in said reaction mixture in an amount ranging from about 5% to about 20% by volume of stabilizing acid per volume of said reaction mixture.

22. An aqueous phase oxidization process as recited in claim 18, wherein said stabilizing acid is capable of generating a stable ammonium salt through the oxidation process.

23. An aqueous phase oxidization process as recited in claim 18, wherein said stabilizing acid is selected from the group consisting of sulfuric acid, phosphoric acid and metallic polyacids.

24. An aqueous phase oxidization process as recited in claim 18, wherein said oxygen gas is included in said reaction mixture in a sufficient quantity that, at a temperature of the reaction mixture, an increase in pressure is provided beyond pressure resulting from any gases formed during the oxidation process in an amount of at least 30 psig.

25. An aqueous phase oxidization process as recited in claim 18, wherein said oxygen gas is included in said reaction mixture in a sufficient quantity that, at a temperature of the reaction mixture, an increase in pressure is provided beyond pressure resulting from any gases formed during the oxidation process in an amount of at least 90 psig.

26. An aqueous phase oxidization process as recited in claim 18, wherein said oxygen gas is included in said reaction mixture in a sufficient quantity that, at a temperature of the reaction mixture, an increase in pressure is provided beyond pressure resulting from any gases formed during the oxidation process in an amount ranging from about 100 psig to about 250 psig.

27. An aqueous phase oxidization process as recited in claim 18, wherein said reaction mixture temperature is in a range from about 100° C. to about 210° C.

28. An aqueous phase oxidization process as recited in claim 18, wherein at least 50% of said reduction products of nitric acid are reoxidized to nitric acid.

29. An aqueous phase oxidization process as recited in claim 18, wherein said final products include ammonium sulfate, the process further comprising recovering ammonium sulfate from said final products.

30. An aqueous phase oxidization process as recited in claim 18, further comprising recovering excess energy produced during oxidation of the feed.

31. An aqueous phase oxidization process as recited in claim 18, wherein the process operates on a continuous basis to the extent that the nitric acid is regenerated.

32. An aqueous phase oxidization process comprising:
(a) providing an oxidizing composition in a reactor, wherein the oxidizing composition includes water, an oxidizing acid, a stabilizing acid and oxygen gas;
(b) continually introducing a nonoxidized feed into the reactor such that the oxidizing composition contacts the nonoxidized feed to yield a reaction mixture in which the feed is oxidized to produce final products, wherein the final products include gases which form pressure within the reactor such that the reaction mixture is maintained under pressure, wherein said oxidizing acid includes nitric acid in an amount of at least about 3% by volume of nitric acid per volume of said reaction mixture;
(c) maintaining said reaction mixture at a temperature not greater than about 210° C.;
(d) continually introducing additional water into the reactor;
(e) continually introducing and dispersing additional oxygen gas into the reactor in a sufficient quantity such that, at a temperature of the reaction mixture, an increase in pressure is provided in said reactor beyond pressure resulting from any gases formed during the oxidation process and to ensure that a substantial portion of reduction products of nitric acid formed during oxidation of the feed are reoxidized to nitric acid primarily in the reactor; and
(f) maintaining the stabilizing acid within the reaction mixture such that the stabilizing acid is present in an amount of at least about 5% and less than 40% by volume of said stabilizing acid per volume of said reaction mixture.

33. An aqueous phase oxidization process as recited in claim 32, wherein said nitric acid is included in an amount ranging from about 3% to about 20% by volume of nitric acid per volume of the reaction mixture.

34. An aqueous phase oxidization process as recited in claim 32, wherein said oxidizing acid further comprises a metallic polyacid.

35. An aqueous phase oxidization process as recited in claim 32, wherein said stabilizing acid is included in said reaction mixture in an amount ranging from about 5% to about 20% by volume of stabilizing acid per volume of said reaction mixture.

36. An aqueous phase oxidization process as recited in claim 32, wherein said stabilizing acid is capable of generating a stable ammonium salt through the oxidation process.

37. An aqueous phase oxidization process as recited in claim 32, wherein said stabilizing acid is selected from the group consisting of sulfuric acid, phosphoric acid and metallic polyacids.

38. An aqueous phase oxidization process as recited in claim 32 wherein said oxygen gas is included in said reaction mixture in a sufficient quantity that, at a temperature of the reaction mixture, an increase in pressure is provided beyond pressure resulting from any gases formed during the oxidation process in an amount greater than about 30 psig.

39. An aqueous phase oxidization process as recited in claim 32, wherein said oxygen gas is included in said reaction mixture in a sufficient quantity that, at a temperature of the reaction mixture, an increase in pressure is provided beyond pressure resulting from any gases formed during the oxidation process in an amount of at least 90 psig.

40. An aqueous phase oxidization process as recited in claim 32, wherein said oxygen gas is included in said reaction mixture in a sufficient quantity that, at a temperature of the reaction mixture, an increase in pressure is provided beyond pressure resulting from any gases formed during the oxidation process in an amount ranging from about 100 psig to about 250 psig.

41. An aqueous phase oxidization process as recited in claim 32, wherein said reaction mixture temperature is in a range from about 100° C. to about 210° C.

42. An aqueous phase oxidization process as recited in claim 32, wherein at least 50% of said reduction products of nitric acid are reoxidized to nitric acid.

43. An aqueous phase oxidization process as recited in claim 32, wherein said final products include ammonium sulfate, the process further comprising recovering ammonium sulfate from said final products.

44. An aqueous phase oxidization process as recited in claim 32, further comprising recovering excess energy produced during oxidation of the feed.

45. An aqueous phase oxidization process as recited in claim 32, wherein the process operates on a continuous basis to the extent that the nitric acid is regenerated.

46. An aqueous phase oxidization process as recited in claim 32, wherein the feed is oxidized to produce final products in an amount of time no greater than 40 minutes.

* * * * *